Figure 1:
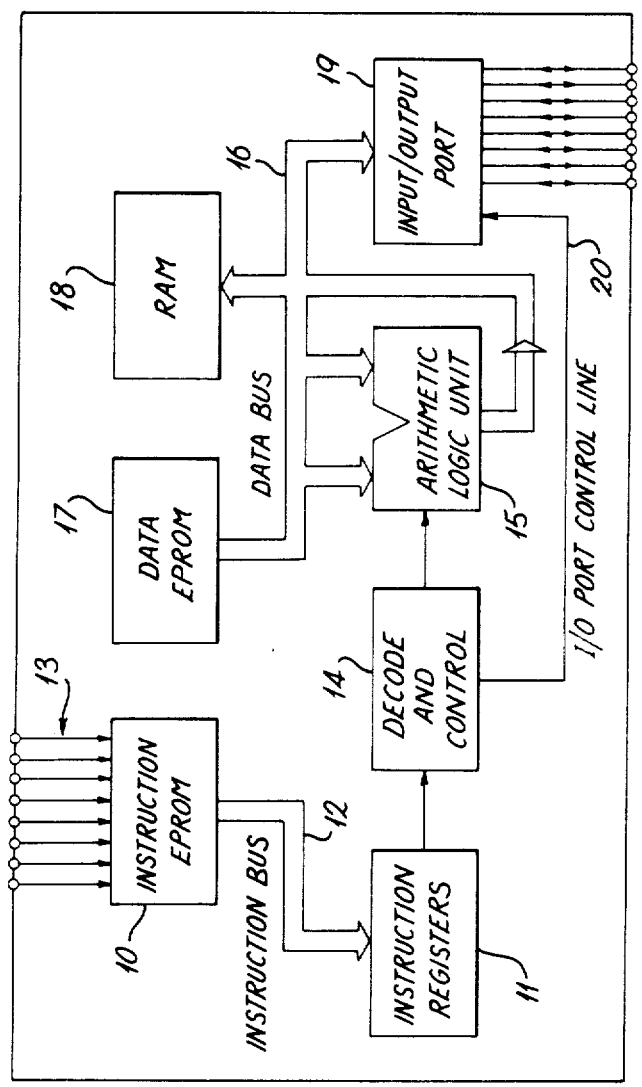

United States Patent [19]

Knight

[11] Patent Number: 4,823,308
[45] Date of Patent: Apr. 18, 1989

[54] MICROCOMPUTER WITH SOFTWARE PROTECTION

[75] Inventor: Michael J. Knight, Dorking, England

[73] Assignee: Knight Technology Ltd., Dorking, England

[21] Appl. No.: 695,194

[22] Filed: Jan. 25, 1985

[30] Foreign Application Priority Data

Feb. 2, 1984 [GB] United Kingdom ............. 8402795

[51] Int. Cl.$^4$ .............................................. G06F 13/00
[52] U.S. Cl. ................................. 364/900; 364/918.7; 364/949.8; 364/969; 364/969.4
[58] Field of Search ... 364/200 MS File, 900 MS File

[56] References Cited

U.S. PATENT DOCUMENTS

| | | | |
|---|---|---|---|
| 3,284,776 | 11/1966 | Freedman | 364/200 |
| 3,328,768 | 6/1967 | Amdahl et al. | 364/200 |
| 3,377,624 | 4/1968 | Nelson et al. | 364/200 |
| 3,858,182 | 12/1974 | Delagi et al. | 364/200 |
| 4,047,244 | 9/1977 | Finkemeyer et al. | 364/200 |
| 4,075,692 | 2/1978 | Sorensen et al. | 364/200 |
| 4,087,856 | 5/1978 | Attanasio | 364/200 |
| 4,124,891 | 11/1978 | Weller, III et al. | 364/200 |
| 4,181,938 | 1/1980 | Suzuki et al. | 364/200 |
| 4,183,085 | 1/1980 | Roberts et al. | 364/200 |
| 4,274,138 | 6/1981 | Shimokawa | 364/200 |
| 4,514,805 | 4/1985 | McDonough et al. | 364/200 |

FOREIGN PATENT DOCUMENTS

| | | |
|---|---|---|
| 0008033 | 2/1980 | European Pat. Off. . |
| 209233 | 8/1982 | United Kingdom . |
| 2116777 | 9/1983 | United Kingdom . |

Primary Examiner—Gareth D. Shaw
Assistant Examiner—Kevin A. Kriess

[57] ABSTRACT

In order to protect key parts of computer programs, the instructions making up those parts are held in an EPROM forming part of a single chip microcomputer. The EPROM is connected to instruction registers by way of an instruction bus. Data used by instructions held in these registers is transferred along a data bus which is separate from the instruction bus and serves a RAM, an ALU and an input/output port. Since the status of the input/output port is ultimately controlled by the instructions and there is no connection between the instruction bus and the data bus the instructions cannot be read either directly or indirectly from the microcomputer.

11 Claims, 2 Drawing Sheets

MICROCOMPUTER WITH SOFTWARE PROTECTION

The present invention relates to the protection of computer software in single chip microcomputers.

Software in microcomputers suffers from the disadvantage that it is difficult to protect from copying and unauthorised use. Programs and data for microcomputers are usually stored on magnetic tapes, floppy discs, hard discs or in bubble memories where they can easily be copied, or in sections of the microcomputer such as RAM, ROM, EPROM or EEPROM where they can also be read, by way of an input-output port and then copied. In general, software as such cannot be the subject of a granted patent in most countries and the author has either to resort to copyright which is in many cases inadequate, or to the inconvenience of encryption.

According to the present invention there is provided a single chip microcomputer comprising a non-volatile memory store for the instructions of a computer program, a first internal communication channel connecting the store to means for executing program instructions, input/output means for passing data to and from the microcomputer, the output means being under sole control of instructions stored in said memory means and a second internal communication channel connecting the input/output means to the means for executing instructions, there being no path, permanent or conditional, for the transfer of instructions between the first and second channels in either direction.

Each of the said internal communications channels preferably comprises a plurality of parallel connected paths which convey binary information between various parts of the microcomputer. Such a group of paths is commonly known as a bus. The first channel is known, following convention, as the instruction or program bus and the second channel is known as the data bus. Most single chip microcomputers are constructed with a single data/instruction bus but a single chip microcomputer is known which uses separate data and instruction busses and in which provision is made for connecting the busses conditionally.

Since the data and instruction busses of the microcomputer of the invention are not connected it is impossible to cause the instructions held by the non-volatile store to be read out by way of the chip terminals.

The input/output means is preferably under the control of the instructions held by the non-volatile store when it is impossible to infer the contents of the store by comparing data passing into and out of an input/output means because data is only input and output when the said instructions so dictate.

The non-volatile memory store may comprise, for example, ROM, EPROM, E²ROM, EAROM or EEPROM, or even RAM where means are provided for the connection of an external battery intended to supply current to the RAM permanently. The means for executing instructions may comprise an arithmetic logic unit (ALU), and a decode and control unit for receiving program instructions from the store and controlling the ALU and the input/output means in accordance with the instructions. The microcomputer may also include RAM and ROM, EPROM, E²ROM, EAROM and EEPROM connected to the second internal communication channel.

Figure 2:
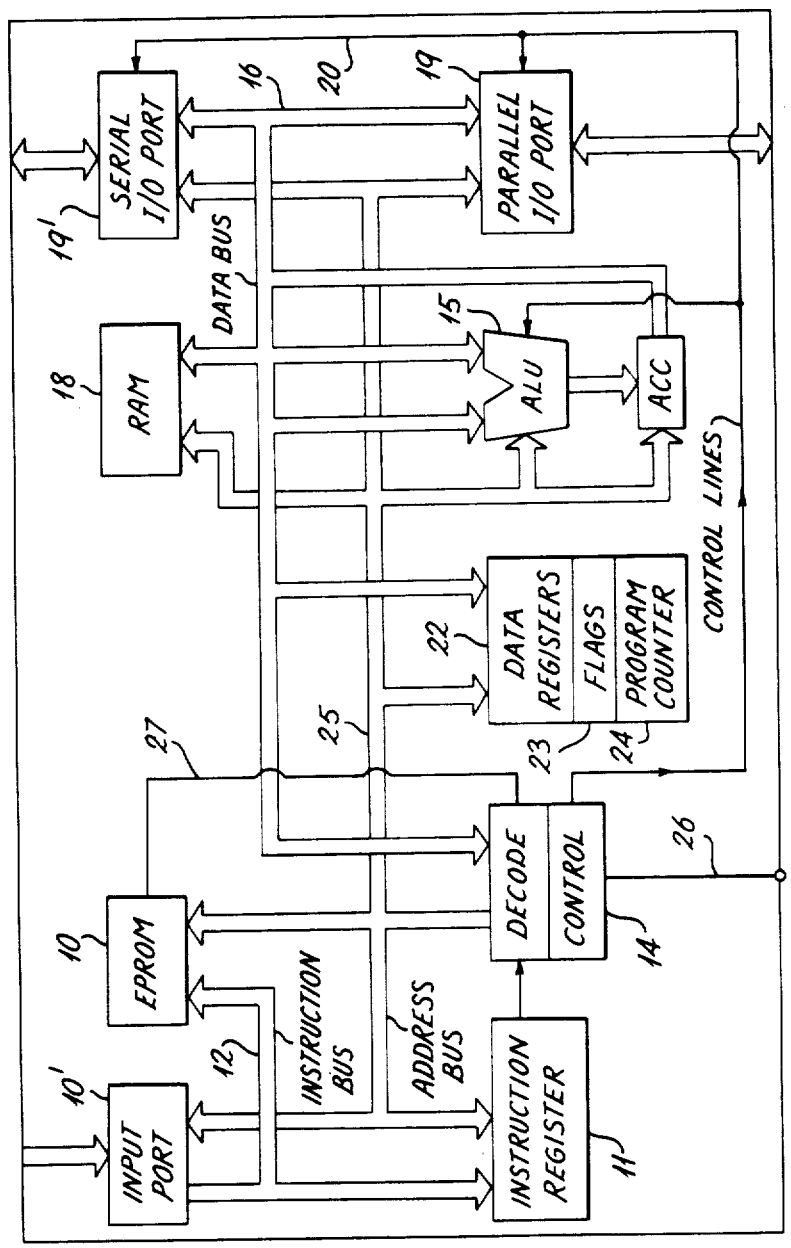

Embodiments of the invention will now be described by way of example with reference to the accompanying drawings in which:

FIG. 1 shows a block diagram of a single chip microcomputer according to the invention, and FIG. 2 shows more detail of the microcomputer of FIG. 1.

Referring to FIG. 1, instructions for operating the microcomputer are held in an instruction EPROM 10 and conveyed to instruction registers 11 by means of an instruction bus 12. The EPROM 10 is provided with an input port shown schematically in FIG. 1 as connections 13 to allow loading. It will be appreciated that the connections 13 do not provide a way of entering instructions to the registers 11 except indirectly and by destroying data held in the EPROM. Instructions which are usually in the form of operation codes (OP CODES) and Operands in the form of data or data addresses or equivalent, are read in sequence from the EPROM 10 into the registers 11 under the control of a decode and control circuit 14. Instructions held in the registers 11 are implemented using an arithmetic logic unit 15 which receives and transmits data by way of a data bus 16. Data for use by the ALU 15 may be held by a RAM 18 and an optional EPROM 17. Data passing to and from the microcomputer passes by way of an input/output port 19 under the control of the decode and control circuit 14 operating by way of a control line 20. Data passing by way of the port 19 may reach or originate from the ALU 15, the EPROM 17 or the RAM 18.

In accordance with the invention the instruction registers and therefore the decode and control unit can only receive instructions from the EPROM 10, there being no connection between the instruction bus 12 and the data bus 16 as there would be in a conventional single chip microcomputer. Therefore no external instructions which would read out the program can reach the EPROM 10. Further it is impossible to obtain instructions stored from the EPROM 10 by way of an output port, since there is no such port coupled to the EPROM 10. Additionally the input/output port 19 is entirely under the indirect control of instructions in the EPROM 10 so no technique of inferring the contents of this EPROM can be carried out by way of the port 19.

The only physical presence of instructions in the EPROM 10 is the state of charge on the EPROM gates. Accordingly additional security is obtained because the instructions cannot be read by optical or X-ray methods. An opaque insulating coating other than the oxides of chip materials is preferably provided on top of the silicon of the chip forming the microcomputer to make reading the instructions by using voltage contrast techniques in a scanning electron microscope impossible. Usually it will be unnecessary to erase the contents of the EPROM 10 so the quartz window normally provided is not required. However the device is referred to as an EPROM since its construction is otherwise similar to a conventional EPROM rather than a PROM. The latter usually have fusible links whose state can, with difficulty, be observed, revealing the contents stored.

Although no description of the detailed working of the microcomputer is described, the conventional form of operation may be employed in which a sequence of instructions is taken from the instruction EPROM 10 either directly or with branching (conditional or otherwise) for use by the registers 11, and data specified by addresses held in the instructions is fetched from the EPROM 17, the RAM 18 or an address external to the microcomputer; operated upon and passed to one of the above mentioned memories or addresses.

FIG. 2 shows more detail of the single chip microcomputer of FIG. 1. The EPROM 10 is provided with an input port 10' which replaces the schematic connections 13 and a serial input/output port 19' is also provided. Dedicated data registers 22, registers for flags 23 and a program counter 24 are shown explicitly (although they may be regarded in FIG. 1 as forming part of the RAM 18). An address bus 25 is also shown and an accumulator but the optional EPROM 17 is omitted.

The microcomputer of FIG. 2 may be an integrated circuit encapsulated in a module which is plugged in to, or otherwise connected to, a host. The module may have a plug or socket arrangement which is compatible with commonly used host computers. The program contained in the microcomputer may comprise several parts each forming an important part of one or more programs run by the host computer.

In operation, the software to be protected is first extracted from the source program and typically consists of a number of important subroutines from various parts of the source program. This software is then reformatted into assembly language of the microcomputer and entered into the EPROM 10. Entry is by way of the input port 10' and an instruction bus, and when entry is to take place a signal is applied to the control portion of the decode and control circuit 14 by way of an external connection 26 and the control portion then applies a write enable signal to the EPROM 10 by way of a connection 27. The control portion also resets the program counter 24 to its lowest address and then the program counter steps through all the addresses of the EPROM locations allowing the EPROM to be loaded by applying synchronous data signals by way of the port 10'.

Applying power to the microcomputer resets the program counter to its lowest address, so that when power is applied the microcomputer becomes ready to operate with the first instruction held in the EPROM 10.

In operation with a host computer, the host carries out its program until it reaches a point where the first part of the program stored in the EPROM 10 is required. At this time a "handshake" procedure takes place in which typically the host sends a "ready?" signal to the decode and control circuit 14 by way of the data bus 16 and one of the input/output ports 19 or 19'. The microcomputer then executes its first instruction which is to send a signal signifying that it is ready back to the host computer from the decode and control circuit 14 by way of the data bus 16. Initialisation data is then sent from the host to the RAM 18 and another "handshake" takes place when all the initialisation data has been sent. As a result the microcomputer carries out another instruction which causes data from a specified location in the RAM 18 to be passed into the program counter 24, this data being used as the address of the next required instruction in the EPROM 10. Thus the host computer can employ a selected part of the program stored in the EPROM 10 by specifying, when initialisation takes place, where the next microcomputer instruction is to be taken from. Instructions are then taken sequentially from the EPROM 10 by way of the bus 12 into the instruction register 11 as the program counter is incremented in the usual way, and operation continues as in the case of the conventional microcomputer. Eventually an instruction will be reached which is at the end of the part of the program to be executed by the microcomputer and this last instruction will initiate further "handshake" signals to hand control back to the host computer.

For most instructions both Op code and Operands are read in sequence from the EPROM 10. However, at various points in the program it is often necessary to use one or more Operands specified by the contents of the RAM 18 which have been imported from the host computer. Normally the instruction register goes through two or three cycles for each instruction: in the first cycle the Op code appears in the instruction register and in the second cycle and third cycle, if any, Operands appear in the instruction register. When an instruction occurs which requires an Operand specified from the RAM 18 an indication is given in the Op code. The address of the required Operand is already in the RAM 18 having been entered either by the host earlier or as a result of operations carried out in the microcomputer. At this point the decode and control circuit addresses the RAM 18 and causes the address of the Operand to be placed in the program counter 24. The new contents of the program counter are used to address the EPROM 10 and the Operand is then read into the instruction register.

Imported Operands are usually only required for jump, call and return instruction where the instruction is conditional on calculation made by the microcomputer itself or the host.

Further details of construction are not given because many suitable procedures and processes are well known. Many well known details of the microcomputer such as the clock and most control lines are omitted from the figures since they are not relevant to the present invention.

Clearly the invention can be put into practice in many other ways with different forms of single chip microcomputer and many such other forms will be apparent to those familiar with such computers. For example the decode and control unit may, and usually does, control many other units than those shown; such additional units may include a shifter, and a multiplier.

In fact any form of single chip microcomputer may be used so long as it is not possible to address storage in the microcomputer holding a program for the operation thereof, or a part of such a program, and obtain the instructions making up the program or part thereof at an output port.

I claim:

1. A single chip microcomputer for protecting computer software from unauthorised copying and use, comprising: non-volatile memory means for non-volatilely storing instructions of a computer program; means for executing said instructions; a first internal communication channel connecting said memory to said means for executing instructions to couple said instructions from said memory means to said executing means; input/output means for passing data to and from the microcomputer, said input/output means being under sole control of instructions stored in said memory means so that said instructions cannot be read or indirectly inferred as a result of other externally-generated instructions controlling said input/output means; and a second internal communication channel connecting the input/output means to the means for executing instructions, wherein said first and second communication channels are configured such that there is no permanent path and no conditional path, for the transfer of instructions between the first and second channels in either direction so that said instructions cannot be read or indirectly inferred by external means.

2. A microcomputer according to claim 1 including input means for passing instructions to said non-volatile memory means for storage therein, wherein the contents of said memory means cannot be read from said input means.

3. A microcomputer according to claim 1 wherein the means for executing program instructions comprises an arithmetic logic unit, and a decode and control unit for receiving program instructions from said memory means and controlling said arithmetic logic unit and said input/output means in accordance with the instructions.

4. A microcomputer according to claim 1 including a second memory connected to the second internal communication channel.

5. A microcomputer according to claim 1 wherein the chip surface is covered with an insulating material, other than oxides of the chip materials.

6. A microcomputer according to claim 1 wherein the chip is encapsulated in a module with a plug or socket arrangement suitable for connecting the microcomputer to another computer.

7. A single-chip microcomputer for protecting computer software from unauthorised copying and use comprising:
  non-volatile memory means for storing instructions of a computer program;
  an instruction bus, coupled to said non-volatile memory means to receive said instructions therefrom;
  means for receiving said instructions from said non-volatile memory means, said receiving means being coupled to said instruction bus;
  input and output means for passing data to and from said microcomputer from external means to said microcomputer, said input and output means being under sole control of said instructions from said non-volatile memory means so that instructions cannot be read or directly inferred as a result of other externally-generated instructions controlling said input and output means;
  a data bus, disposed to be completely distinct and have no connections to said instruction bus, so that instructions cannot be read or indirectly inferred by external means, for receiving said data from said input and output means, and;
  means coupled to said data bus, for executing said instructions in said receiving means to thereby control said input and output means.

8. An apparatus as in claim 7, wherein said non-volatile memory means is an EPROM.

9. An microcomputer as in claim 7 wherein said executing means is also for effecting operations on said data on said data bus.

10. A microcomputer as in claim 9 wherein said executing means includes an arithmetic logic unit and a decode and control device.

11. An apparatus as in claim 1, wherein said first internal communication channel is an instruction bus, and said second internal communication channel is a data bus.

* * * * *